(12) United States Patent
Wakazono et al.

(10) Patent No.: US 10,024,764 B2
(45) Date of Patent: Jul. 17, 2018

(54) TIRE HOLDING MEMBER FOR TIRE TESTING MACHINE

(75) Inventors: Takehiko Wakazono, Takasago (JP); Masanobu Kurumaji, Takasago (JP)

(73) Assignee: Kobe Steel, Ltd., Hyogo (JP)

(*) Notice: Subject to any disclaimer, the term of this patent is extended or adjusted under 35 U.S.C. 154(b) by 616 days.

(21) Appl. No.: 14/002,352

(22) PCT Filed: Feb. 27, 2012

(86) PCT No.: PCT/JP2012/001327
§ 371 (c)(1),
(2), (4) Date: Aug. 29, 2013

(87) PCT Pub. No.: WO2012/117717
PCT Pub. Date: Sep. 7, 2012

(65) Prior Publication Data
US 2013/0334754 A1    Dec. 19, 2013

(30) Foreign Application Priority Data
Mar. 2, 2011    (JP) .................. 2011-045463

(51) Int. Cl.
*G01M 17/02*    (2006.01)
(52) U.S. Cl.
CPC .................. *G01M 17/021* (2013.01)
(58) Field of Classification Search
None
See application file for complete search history.

(56) References Cited

U.S. PATENT DOCUMENTS 2,876,573 A * 3/1959 Schmidt .................. B44B 3/06
                                                                34/58
3,001,334 A    9/1961 Giusti et al.
(Continued)

FOREIGN PATENT DOCUMENTS

CN    1374510 A    10/2002
JP    60-071237 A    4/1985
(Continued)

OTHER PUBLICATIONS

International Search Report; PCT/JP2012/001327; dated May 1, 2012.
(Continued)

*Primary Examiner* — Christopher M Koehler
*Assistant Examiner* — Brian Keller
(74) *Attorney, Agent, or Firm* — Studebaker & Brackett PC (57) ABSTRACT

A tire holding member for a tire testing machine includes: a bottom rim, which is attached to a bottom spindle that is able to rotate around a central axis in the vertical direction; a top rim, which is disposed above the bottom spindle and which is attached to the bottom end of a top spindle that is able to rotate around the central axis with the bottom spindle; and a convex-sided member. One of the bottom rim or the top rim has a hole with the central axis at the center thereof. The other of the bottom rim or the top rim has an end surface facing the one rim. The bottom rim and the top rim are positioned by each other in a state in which the center of each coincides at the central axis due to the protruding section and the hole engaging with each other.

3 Claims, 5 Drawing Sheets

(56) References Cited

U.S. PATENT DOCUMENTS

| | | | | |
|---|---|---|---|---|
| 4,971,128 A * | 11/1990 | Koga | ................... | G01M 17/021 |
| | | | | 127/21 |
| 5,087,088 A * | 2/1992 | Milam | ................ | E05B 15/0006 |
| | | | | 292/110 |
| 5,719,331 A * | 2/1998 | Delmoro | ............. | G01M 17/021 |
| | | | | 73/146 |
| 7,240,543 B2 * | 7/2007 | Cargould | ............ | G01M 17/022 |
| | | | | 73/146 |
| 2002/0124650 A1 | 9/2002 | Matsumoto | | |
| 2009/0308156 A1 | 12/2009 | Sumimoto et al. | | |

FOREIGN PATENT DOCUMENTS

| | | |
|---|---|---|
| JP | 08-118509 A | 5/1996 |
| JP | 09-126956 A | 5/1997 |
| JP | 2010-127848 A | 6/2010 |
| TW | 201000332 A | 1/2010 |

OTHER PUBLICATIONS

Written Opinion of the International Searching Authority; PCT/JP2012/001327; dated May 1, 2012.

The extended European search report issued by the European Patent Office dated Feb. 23, 2015, which corresponds to European Patent Application No. 12751987.4-1557 and is related to U.S. Appl. No. 14/002,352.

* cited by examiner

TIRE HOLDING MEMBER FOR TIRE TESTING MACHINE

TECHNICAL FIELD

The present invention relates to a tire holding member used for a tire testing machine conducting a performance test of a tire.

BACKGROUND ART

A tire holding member which is used for a tire testing machine and holds a tire in the vertical direction has a structure in which a top rim and a bottom rim are superimposed in consideration of easiness of tire change. As such a superimposition structure, an engaging structure of a protruding section and a recessed section is used. Specifically, an engaging part with a protruding section is provided on one rim, and an engaging part with a recessed section is provided on the other rim. By engaging these engaging parts, a pair of rime is positioned by each other in a superimposed state.

In Patent Document 1, a rim device for a tire uniformity machine in which a rim inner tube fixed to a rim body of an upper rim and a rim inner tube fixed to a rim body of a lower rim are engaged is disclosed.

Now, engaging parts provided respectively on the pair of rims are usually integrated with the rim bodies or attached over the entire area in the thickness direction of the rims. However, in such a structure, when manufacturing a rim, the thickness of the original material (the unprocessed material) must be increased by an equivalent for the engaging parts, and portions to be cut and discarded are increased, therefore the cost is increased and the rim becomes expensive.

CITATION LIST

Patent Document

Patent Document 1: JP 8-118509 A

SUMMARY OF INVENTION

It is an object of the present invention to provide a tire holding member for a tire testing machine capable of reducing the cost.

A tire holding member for a tire testing machine in the present invention is provided with: a bottom rim, which is attached to the upper end of a bottom spindle that is able to rotate around a central axis in the vertical direction; a top rim, which is disposed above the bottom spindle and which is attached to the bottom end of a top spindle that is able to rotate around the central axis with the bottom spindle; and a convex-sided member, which is separate to the bottom rim and the top rim. One of the bottom rim or the top rim has a hole with the central axis at the center thereof. The other of the bottom rim or the top rim has an end surface facing the one rim. The convex-sided member is attached to the end surface of the other rim, and has a protruding section positioned closer to the hole side than the end surface side. The bottom rim and the top rim are positioned by each other in a state in which the center of each coincides at the central axis due to the protruding section and the hole engaging with each other.

DESCRIPTION OF EMBODIMENTS

Hereinafter, preferred embodiments of the present invention will be described with reference to the drawings.

First Embodiment (Configuration of Tire Testing Machine)

Figure 1:
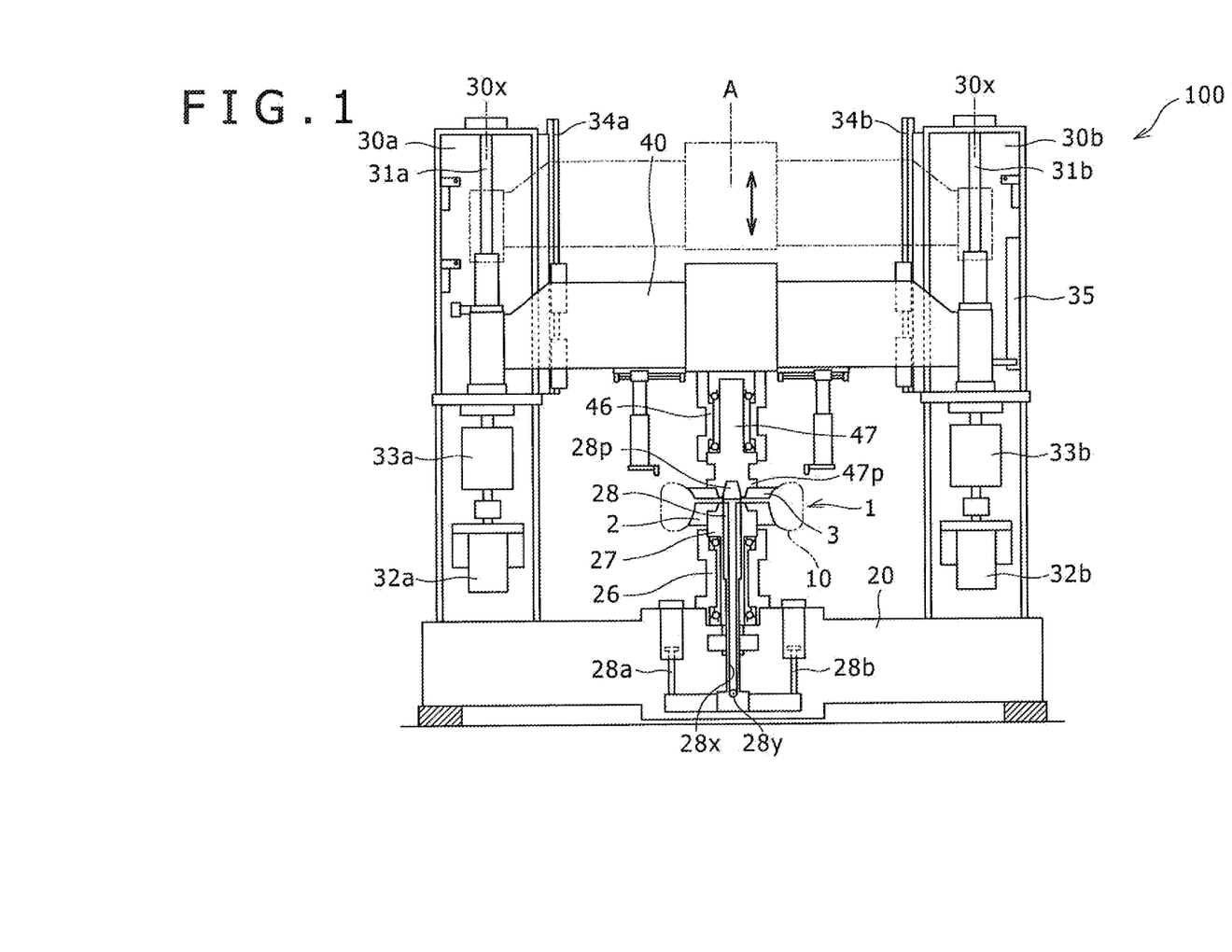
FIG. 1 is a side view showing a tire testing machine provided with a tire holding member according to a first embodiment of the present invention.

A tire holding member for a tire testing machine 1 in a first embodiment of the present invention is used for a tire testing machine 100. As shown in FIG. 1, the tire testing machine 100 has a bottom frame 20, a pair of vertical frames 30*a*, 30*b*, which is attached to the bottom frame 20, a beam 40, which is laid between the vertical frames 30*a*, 30*b* and is able to move in the vertical direction, a bottom spindle 27, which is disposed above the bottom frame 20, and a top spindle 47, which is disposed below the beam 40.

The bottom frame 20 is made of, for example, a member obtained by welding and bonding steel sheets, or steel materials such as H-steel or I-steel, and extends in the horizontal direction. The vertical frames 30*a*, 30*b* is made of, for example, a member obtained by welding and bonding steel sheets, or a square-shaped steel pipe, and is fixed to an upper surface of the bottom frame 20 by a bolt, a nut or the like. The vertical frames 30*a*, 30*b* extend from the bottom frame 20 upward in the vertical direction. To a side surface of the vertical frame 30*a* facing the vertical frame 30*b* a linear motion guide 34*a* is attached, and to a side surface of the vertical frame 30*b* facing the vertical frame 30*a* a linear motion guide 34*b* is attached. Moreover, on the vertical frames 30*a*, 30*b*, ball screws 31*a*, 31*b* are provided respectively. The ball screw 31*a* extends in the vertical direction within an interior space of the vertical frame 30*a*, and the ball screw 31*b* extends in the vertical direction within an interior space of the vertical frame 30*b*.

The beam 40 is made of, for example, a member obtained by welding and bonding steel sheets, or steel materials such as H-steel or I-steel. One end of the beam 40 is connected to a nut of the ball screw 31*a*, and the other end of the beam 40 is connected to a nut of the ball screw 31*b*. The beam 40 is supported by the pair of vertical frames 30*a*, 30*b* through the ball screws 31*a*, 31*b* and the linear motion guides 34*a*, 34*b*. The beam 40 moves upward or downward in the vertical direction while being guided by the linear motion guides 34*a*, 34*b* along with the rotation of the ball screws 31*a*, 31*b*. When the beam 40 moves upward and downward, its posture is maintained in the horizontal direction between the vertical frames 30*a*, 30*b*. The vertical position of the beam 40 is detected by a linear sensor 35 provided on the vertical frame 30*b*.

On the ball screw 31*a* a motor 32*a* and an electromagnetic brake 33*a* are provided, and on the ball screw 31*b* a motor 32*b* and an electromagnetic brake 33*b* are provided. That is, the ball screws 31a, 31b are synchronously driven by the separate motors 32a, 32b. Moreover, the rotation of the ball screws 31a, 31b stops by the electromagnetic brakes 33a, 33b.

The bottom spindle 27 is arranged within a bottom housing 26 which is fixed to the center in the longitudinal direction of the bottom frame 20. Within the bottom spindle 27, a plunger 28 is arranged. Moreover, to the upper end of the bottom spindle 27, a disk-shaped bottom rim 2 is detachably attached. The bottom spindle 27 rotates around a central axis A in the vertical direction by driving a motor (not shown).

The plunger 28 is able to rotate around the central axis A in the vertical direction with the bottom spindle 27. The plunger 28 is able to expand and contract in the vertical direction by driving air cylinders 28a, 28b. When the plunger 28 expands and contracts, it relatively moves in the vertical direction with respect to the bottom spindle 27 which does not expand and contract. The plunger 28 is an elongated rod member in the vertical direction, and its upper end 28p has a tapered protruding section. In the protruding section, its outside surface includes an inclined surface inclined with respect to the vertical direction.

Moreover, within the plunger 28, an air supply hole 28x is formed over from the bottom end to the vicinity of the upper end 28p along the vertical direction. The air supply hole 28x is connected to a rotary joint 28y which is arranged at the bottom end of the plunger 28. Through the air supply hole 28x, the compressed air is supplied to an interior space of a tire 10. A bottom rim 2 is arranged so as to surround the upper end of the bottom spindle 27, and is able to rotate around the central axis A in the vertical direction with the bottom spindle 27.

The top spindle 47 is arranged within a top housing 46 which is fixed to the center in the longitudinal direction of the beam 40. The top spindle 47 is disposed above in the vertical direction with respect to the bottom spindle 27. To the bottom end of the top spindle 47, a disk-shaped top rim 3 is detachably attached. The top spindle 47 is held by the beam 40. Accordingly, the top spindle 47 moves upward or downward along the vertical direction of the pair of vertical frames 30a, 30b, along with the vertical movement of the beam 40. Moreover, the top spindle 47 is fixed to the vertical frames 30a, 30b with the beam 40, by the electromagnetic brakes 33a, 33b.

A bottom end 47p of the top spindle 47 has a recessed section which is able to engage with the protruding section at the upper end 28p of the plunger 28. That is, the inside surface of the recessed section is an inclined surface inclined at the same angle as the protruding section with respect to the vertical direction. The top rim 3 is arranged so as to surround the bottom end 47p of the top spindle 47, and is able to rotate around the central axis A in the vertical direction with the top spindle 47.

The bottom spindle 27 extends above from the center in the longitudinal direction of the bottom frame 20. The top spindle 47 is arranged at a position facing the vertical direction with respect to the bottom spindle 27. That is, the central axis A that serves as a rotation axis of the bottom spindle 27, the plunger 28, the bottom rim 2, the top spindle 47, and the top rim 3 coincides with the center in the longitudinal direction of the bottom frame 20.

In the above configuration, when the bottom end 47p of the top spindle 47 and the upper end 28p of the plunger 28 are engaged, the tire 10 is held by the top rim 3 and the bottom rim 2, and a gap between the top and bottom rims 3 and 2 and the tire 10 is sealed. Then, the compressed air is supplied to the interior space of the tire 10, and air pressure of the tire 10 is adjusted to a predetermined pressure. Thereafter, when the bottom spindle 27 rotates by the motor, the top spindle 47 rotates with the bottom spindle 27. Thereby, the tire 10 rotates around the central axis A. Then, a drum (not shown) presses the side surface of the rotating tire 10, thereby conducting various performance tests of the tire 10.

(Configuration of Tire Holding Member)

Figure 2:
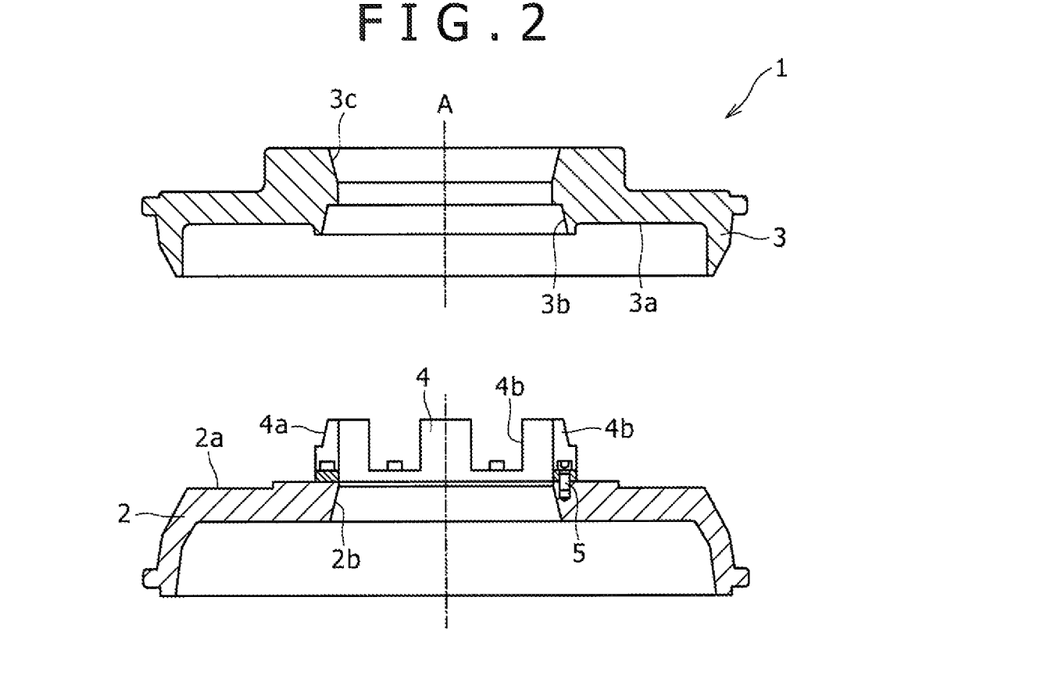
FIG. 2 is a cross-sectional view showing the tire holding member according to the first embodiment.

As shown in FIG. 2, the tire holding member 1 of the present embodiment has the bottom rim 2, which is attached to the upper end of the bottom spindle 27, and the top rim 3, which is attached to the bottom end 47p of the top spindle 47. In the present embodiment, the bottom rim 2 and the top rim 3 are made of stainless, but a material of the rims 2, 3 is not limited to stainless.

On the top rim 3, a tapered section 3c, which is able to engage with a tapered section (not shown) formed at the bottom end 47p of the top spindle 47 and including the central axis A at the center thereof, is formed. The tapered section 3c has an inclined surface inclined with respect to the vertical direction. The inclined surface is inclined with respect to the central axis A so as to approach the central axis A toward the lower part. The inclined surface is inclined at the same angle with respect to the vertical direction as the inclined surface of the tapered section formed at the bottom end 47p of the top spindle 47. Thereby, highly precise centering between the top rim 3 and the top spindle 47 can be easily performed.

The top rim 3 has an end surface (a main surface) 3a facing the bottom rim 2. In the present embodiment, the end surface 3a is a lower surface of the top rim 3. In the end surface 3a, a hole 3b with the central axis A at the center thereof is formed. The inside surface of the hole 3b has a tapered shape. Specifically, the inside surface of the hole 3b is inclined with respect to the central axis A so as to approach the central axis A toward the upper part.

On the bottom rim 2, a tapered section 2b, which is able to engage with a tapered section (not shown) formed at the upper end of the bottom spindle 27 and including the central axis A at the center thereof, is formed. The tapered section 2b has an inclined surface inclined with respect to the vertical direction. The inclined surface is inclined with respect to the central axis A so as to approach the central axis A toward the upper part. The inclined surface is inclined at the same angle with respect to the vertical direction as the above tapered section formed at the upper end of the bottom spindle 27. Thereby, highly precise centering between the bottom rim 2 and the bottom spindle 27 can be easily performed.

The bottom rim 2 has an end surface (a main surface) 2a facing the top rim 3. In the present embodiment, the end surface 2a is an upper surface of the bottom rim 2. To the end surface 2a, a convex-sided annular member 4 as a convex-sided member, which is separate to the bottom rim 2 and the top rim 3, is attached. The convex-sided annular member 4 is arranged at a position facing the hole 3b. The convex-sided annular member 4 has an annular shape with the central axis A at the center thereof. The convex-sided annular member 4 is able to engage with the hole 3b. The convex-sided annular member 4 is positioned closer to the hole 3b side than the end surface 2a side.

Figure 3:
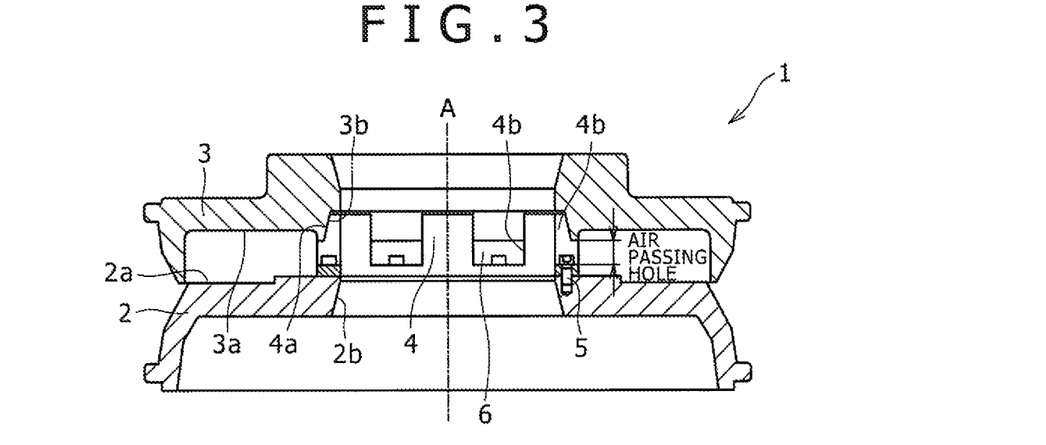
FIG. 3 is a cross-sectional view showing the tire holding member according to the first embodiment.

The convex-sided annular member 4 has a tapered section (protruding section) 4a, which is able to engage with the hole 3b that serves as a recessed section. The outer peripheral surface of the tapered section 4a has a tapered shape. The tapered section 4a is provided in a region of a tip side (an upper side) on the outer peripheral surface of the convex-sided annular member 4. The tapered section 4a has an inclined surface inclined with respect to the vertical direction. The inclined surface is inclined with respect to the central axis A so as to approach the central axis A toward the upper part. The inclined surface is inclined at the same angle with respect to the vertical direction as the tapered inside surface of the hole 3b formed in the top rim 3. Therefore, as shown in FIG. 3, when the rims are exchanged or stored, by engaging the outer peripheral surface of the tapered section 4a of the convex-sided annular member 4 and the inside surface of the hole 3b, the bottom rim 2 and the top rim 3 can be superimposed at a desired position.

As thus described, in the present embodiment, in the convex-sided annular member 4 attached to the end surface 2a of the bottom rim 2, the tapered section 4a thereof serves as a protruded engaging part and engages with the hole 3b that serves as a recessed engaging part. Thereby, the bottom rim 2 and the top rim 3 can be superimposed at a desired position. Accordingly, when manufacturing a rim, it is not necessary to use a material whose thickness is increased by an equivalent for the engaging parts, and portions to be cut and discarded are decreased, therefore the cost can be reduced.

Moreover, by adopting the configuration in which the inside surface of the hole 3b having a tapered shape and the outer peripheral surface of the tapered section 4a having a tapered shape are engaged, centering between the top rim 3 and the bottom rim 2 can be easily performed.

Moreover, the convex-sided annular member 4 has a plurality of recessed sections 4b, which is recessed toward the bottom rim 2 side from an edge facing the top rim 3. The plurality of recessed sections 4b is aligned in the circumferential direction of the convex-sided annular member 4. The convex-sided annular member 4 is screwed to the bottom rim 2 by a bolt 5 at these recessed sections 4b. Therefore, in the present embodiment, since it is not necessary to provide a flange portion for screwing at the convex-sided annular member 4, the convex-sided annular member 4 can be made compact.

Moreover, in the present embodiment, as shown in FIG. 3, even when the hole 3b and the convex-sided annular member 4 are engaged in a direction of the central axis A at a position where the bottom rim 2 and the top rim 3 are close to each other, a space 6 inside the convex-sided annular member 4 is communicated with the outside through the recessed sections 4b. Specifically, the depth of the recessed sections 4b is larger than the engaging length in the direction of the central axis A where the hole 3b and the convex-sided annular member 4 are engaged (the length in the direction of the central axis A of the region where the hole 3b and the tapered section 4a face each other in the radial direction). Thereby, as shown in FIG. 3, a portion of the recessed section 4b (a region at the bottom rim 2 side of the recessed section 4b) serves as an air passing hole for communicating the space 6 inside the radial direction of the convex-sided annular member 4 and a space outside the radial direction. When the tire 10 is held by the bottom rim 2 and the top rim 3 as shown in FIG. 1, the space 6 inside the radial direction of the convex-sided annular member 4 is in communication with the space outside the radial direction (the interior space of the tire) through a portion of the recessed section 4b as shown in FIG. 3. Therefore, the compressed air introduced into the space 6 through the air supply hole 28x is supplied to the interior space of the tire 10 through a portion of the recessed section 4b. Accordingly, in the present embodiment, it is not necessary to separately provide a path for supplying the air introduced into the space 6 inside the radial direction of the convex-sided annular member 4 into the tire 10.

(Effect)

In a case where the protruded engaging part (the engaging part with the protruding section) provided on the rim is integrated with the rim body or attached over the entire area in the thickness direction of the rim, the thickness of the original material must be increased by an equivalent for the engaging part, the material cost becomes high, and portions to be cut and discarded are increased. Particularly, although stainless steel may be adopted as a material for the rim from the viewpoint of rust prevention, stainless steel is expensive and not easy to cut.

Thus, in the present embodiment, the convex-sided annular member 4 attached to the end surface 2a of the bottom rim 2 is separate to the bottom rim 2 and the top rim 3, and is positioned closer to the hole 3b side than the end surface 2a side. Then, the tapered section (protruding section) 4a of the convex-sided annular member 4 engages with the hole 3b. Thereby, the bottom rim 2 and the top rim 3 can be superimposed at a desired position. Accordingly, when manufacturing a rim, it is not necessary to use a material whose thickness is increased by an equivalent for the engaging parts, and portions to be cut and discarded are decreased, therefore the cost can be reduced.

Moreover, by adopting the configuration in which the inside surface of the recessed section (hole) 3b having a tapered shape and the outer peripheral surface of the protruding section (tapered section) 4a having a tapered shape are engaged, centering between the top rim 3 and the bottom rim 2 can be easily performed.

Moreover, by adopting the configuration in which the convex-sided annular member 4 is screwed to the bottom rim 2 at the recessed section 4b, it is not necessary to provide a flange portion for screwing at the convex-sided annular member 4. Therefore, since the convex-sided annular member 4 can be made compact, the material cost can be reduced.

Moreover, even when the hole 3b and the convex-sided annular member 4 are engaged in the direction of the central axis A at a position where the bottom rim 2 and the top rim 3 are close to each other, the space 6 inside the convex-sided annular member 4 is communicated with the outside (the interior space of the tire) through the recessed sections 4b. Therefore, when the tire 10 is held by the bottom rim 2 and the top rim 3, the air introduced into the space 6 inside the convex-sided annular member 4 is supplied into the tire 10. Accordingly, it is not necessary to separately provide a path for supplying the air introduced into the space 6 inside the convex-sided annular member 4 into the tire 10.

Moreover, by adopting the configuration in which the tapered section 2b of the bottom rim 2 is engaged with the tapered section formed at the upper end of the bottom spindle 27 and the tapered section 3c of the top rim 3 is engaged with the tapered section formed at the bottom end 47p of the top spindle 47, highly precise centering between the rim and the spindle can be easily performed.

Second Embodiment (Configuration of Tire Holding Member)

Figure 4:
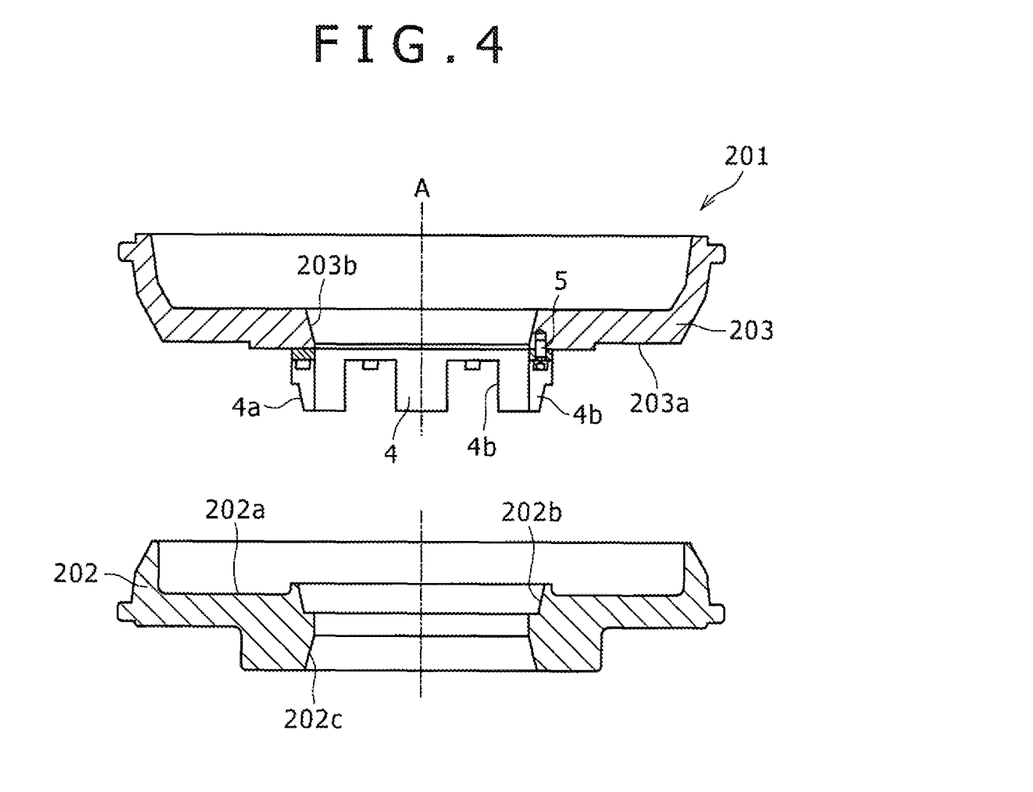
FIG. 4 is a cross-sectional view showing a tire holding member according to a second embodiment of the present invention.

Next, a tire holding member 201 according to a second embodiment of the present invention will be described. In addition, components same as the above-mentioned components are designated by the same reference numerals, and explanation thereof will be omitted. The tire holding member 201 of the second embodiment is different from the tire holding member 1 of the first embodiment in that, as shown in FIG. 4, in an end surface 202*a* of a bottom rim 202 facing a top rim 203 a hole 202*b* with the central axis A at the center thereof is formed, and to an end surface 203*a* of the top rim 203 facing the bottom rim 202 the convex-sided annular member 4 as the convex-sided member, which is separate to the bottom rim 202 and the top rim 203, is attached by the bolt 5. That is, the tire holding member 201 of the second embodiment has a configuration in which the top rim and the bottom rim of the first embodiment are arranged in an upside-down position.

On the bottom rim 202, a tapered section 202*c*, which engages with a tapered section (not shown) with the central axis A at the center thereof formed at the upper end of the bottom spindle 27, is formed. The tapered section 202*c* is an inclined surface inclined at the same angle with respect to the vertical direction as the tapered section formed at the upper end of the bottom spindle 27. Similarly, on the top rim 203, a tapered section 203*b*, which engages with a tapered section (not shown) with the central axis A at the center thereof formed at the bottom end 47*p* of the top spindle 47, is formed. The tapered section 203*b* is an inclined surface inclined at the same angle with respect to the vertical direction as the tapered section formed at the bottom end 47*p* of the top spindle 47.

The outer peripheral surface of the tapered section 4*a* of the convex-sided annular member 4 is an inclined surface inclined at the same angle with respect to the vertical direction as the inside surface of the tapered hole 202*b* in the bottom rim 202. By engaging the outer peripheral surface of the tapered section 4*a* and the inside surface of the hole 202*b*, the bottom rim 202 and the top rim 203 are superimposed at a desired position.

(Effect)

In the tire holding member 201 according to the present embodiment, similar effects to the tire holding member 1 of the first embodiment are achieved.

Third Embodiment (Configuration of Tire Holding Member)

Figure 5:
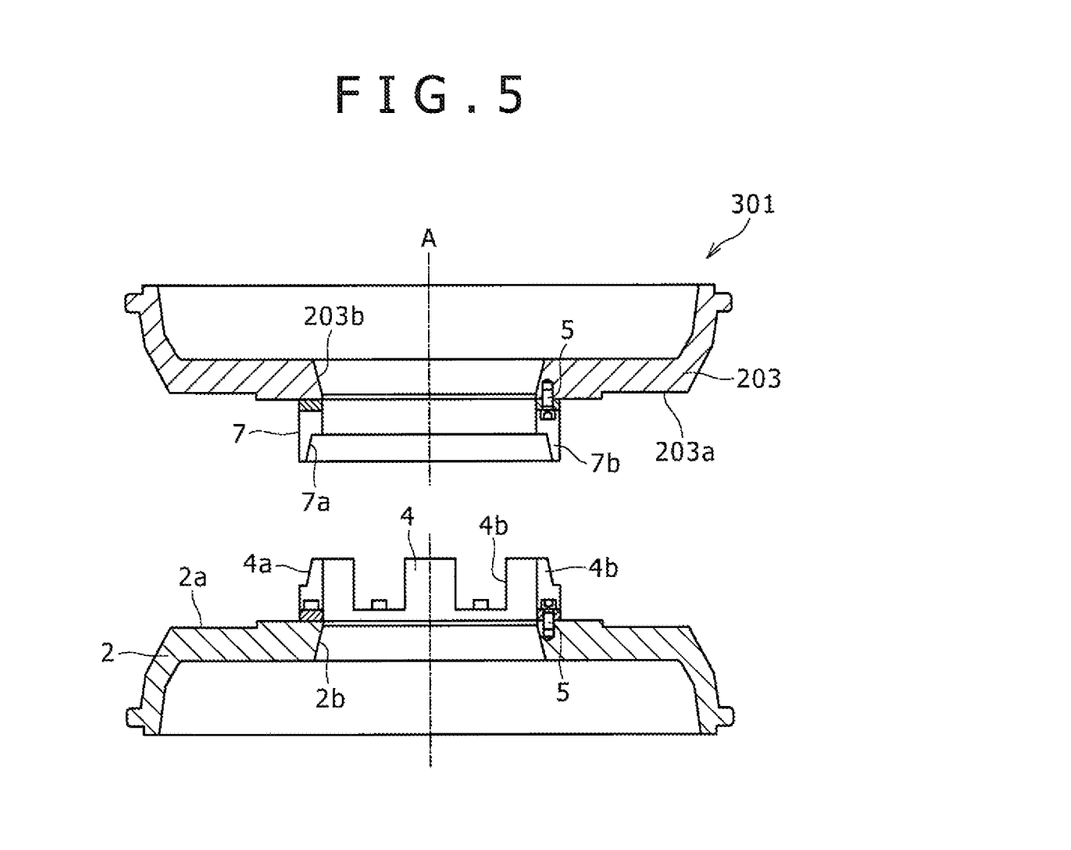
FIG. 5 is a cross-sectional view showing a tire holding member according to a third embodiment of the present invention.

Next, a tire holding member 301 according to a third embodiment of the present invention will be described. In addition, components same as the above-mentioned components are designated by the same reference numerals, and explanation thereof will be omitted. The tire holding member 301 of the third embodiment is different from the tire holding member 1 of the first embodiment in that, as shown in FIG. 5, on the top rim 203 of the second embodiment, a concave-sided annular member 7 as a concave-sided member, which is separate to the bottom rim 2 and the top rim 203, is attached to the end surface 203*a* of the top rim 203 facing the bottom rim 2. The concave-sided annular member 7 has an annular shape with the central axis A at the center thereof, and is a member with a recessed section at the bottom rim 2 side. The concave-sided annular member 7 is positioned closer to the bottom rim 2 side than the end surface 203*a* side.

The concave-sided annular member 7 has a plurality of recessed sections 7*b*, which is recessed toward the top rim 203 side from an edge facing the bottom rim 2. The plurality of recessed sections 7*b* is aligned in the circumferential direction of the concave-sided annular member 7. The concave-sided annular member 7 is screwed to the top rim 3 by the bolt 5 at these recessed sections 7*b*.

Moreover, the concave-sided annular member 7 has a tapered section (recessed section) 7*a*. The inner peripheral surface of the tapered section 7*a* has a tapered shape. The tapered section 7*a* engages with the outer peripheral surface of the tapered section 4*a* of the convex-sided annular member 4 attached to the bottom rim 2. The inner peripheral surface of the tapered section 7*a* of the concave-sided annular member 7 is an inclined surface inclined at the same angle with respect to the vertical direction as the outer peripheral surface of the tapered section 4*a* of the convex-sided annular member 4. The tapered section 7*a* is formed in a region at the bottom rim 2 side of the concave-sided annular member 7. On the other hand, the tapered section (protruding section) 4*a* is formed in a region at the top rim 203 side of the convex-sided annular member 4. By engaging the tapered section 4*a* of the convex-sided annular member 4 and the tapered section 7*a* of the concave sided member 7, the bottom rim 2 and the top rim 203 are superimposed at a desired position.

In such a manner, to the end surface 203*a* of the top rim 203 the concave-sided annular member 7, which is separate to the bottom rim 2 and the top rim 203, is attached, and to the end surface 2*a* of the bottom rim 2 the convex-sided annular member 4, which is separate to the bottom rim 2 and the top rim 203, is attached. The tapered section 7*a* of the concave-sided annular member 7 serves as a recessed engaging part, and the tapered section 4*a* of the convex-sided annular member 4 serves as a protruded engaging part. Then, by engaging these engaging parts, the top rim 203 and the bottom rim 2 are superimposed. Thereby, when manufacturing a rim, it is not necessary to use a material whose thickness is increased by an equivalent for the engaging parts, and portions to be cut and discarded are decreased, therefore the cost can be reduced.

Moreover, by adopting the configuration in which the inner peripheral surface of the tapered section 7*a* having a tapered shape and the outer peripheral surface of the tapered section 4*a* having a tapered shape are engaged, centering between the top rim 203 and the bottom rim 2 can be easily performed.

Moreover, even when the tapered section 7*a* of the concave-sided annular member 7 and the tapered section 4*a* of the convex-sided annular member 4 are engaged in the direction of the central axis A, the space 6 inside the convex-sided annular member 4 is communicated with the outside through the recessed sections 4*b*. Specifically, the depth of the recessed sections 4*b* is larger than the engaging length in the direction of the central axis A where the tapered section 7*a* of the concave-sided annular member 7 and the tapered section 4*a* of the convex-sided annular member 4 are engaged (the length in the direction of the central axis A of the region where the tapered section 7*a* of the concave-sided annular member 7 and the tapered section 4*a* of the convex-sided annular member 4 face each other in the radial direction). Thereby, a portion of the recessed section 4*b* (a region at the bottom rim 2 side of the recessed section 4*b*) serves as an air passing hole for communicating the space inside the radial direction of the convex-sided annular member 4 and the space outside the radial direction. As shown in FIG. 1, when the tire 10 is held by the bottom rim 2 and the top rim 3, the space inside the radial direction of the convex-sided annular member 4 is in communication with the space outside the radial direction (the interior space of the tire) through a portion of the recessed section 4*b*. Therefore, the compressed air introduced into the space inside the radial direction of the convex-sided annular member 4 through the air supply hole 28*x* is supplied to the interior space of the tire 10 through a portion of the recessed section 4*b*.

(Effect)

In a case where the protruded engaging part (the engaging part with the protruding section) and the recessed engaging part (the engaging part with the recessed section) provided on the rim are integrated with the rim body or attached over the entire area in the thickness direction of the rim, the thickness of the original material must be increased by an equivalent for the engaging parts, the material cost becomes high, and portions to be cut and discarded are increased. Particularly, although stainless steel may be adopted as a material for the rim from the viewpoint of rust prevention, stainless steel is expensive and not easy to cut.

Thus, in the present embodiment, the concave-sided annular member 7 attached to the end surface 203a of the top rim 203 is separate to the rims 2, 203, and is positioned closer to the bottom rim 2 side than the end surface 203a side. The convex-sided annular member 4 attached to the end surface 2a of the bottom rim 2 is separate to the rims 2, 203, and is positioned closer to the top rim 203 side than the end surface 2a side. Then, the protruding section (tapered section) 4a of the convex-sided annular member 4 engages with the recessed section (tapered section) 7a of the concave-sided annular member 7. Thereby, when manufacturing a rim, it is not necessary to use a material whose thickness is increased by an equivalent for the engaging parts, and portions to be cut and discarded are decreased. Therefore, the cost can be reduced.

Moreover, by adopting the configuration in which the inner peripheral surface of the tapered section 7a having a tapered shape and the outer peripheral surface of the tapered section 4a having a tapered shape are engaged, centering between the top rim 203 and the bottom rim 2 can be easily performed.

Moreover, even when the recessed engaging part (the tapered section 7a) of the concave-sided annular member 7 and the protruded engaging part (the tapered section 4a) of the convex-sided annular member 4 are engaged in the direction of the central axis A at a position where the bottom rim 2 and the top rim 3 are close to each other, the space 6 inside the convex-sided annular member 4 is communicated with the outside (the interior space side of the tire) through the recessed sections 4b. Therefore, when the tire 10 is held by the bottom rim 2 and the top rim 3, the air introduced into the space 6 inside the convex-sided annular member 4 is supplied into the tire 10 through the recessed sections 4b. Accordingly, it is not necessary to separately provide a path for supplying the air introduced into the space 6 inside the convex-sided annular member 4 into the tire 10.

Fourth Embodiment (Configuration of Tire Holding Member)

Figure 6:
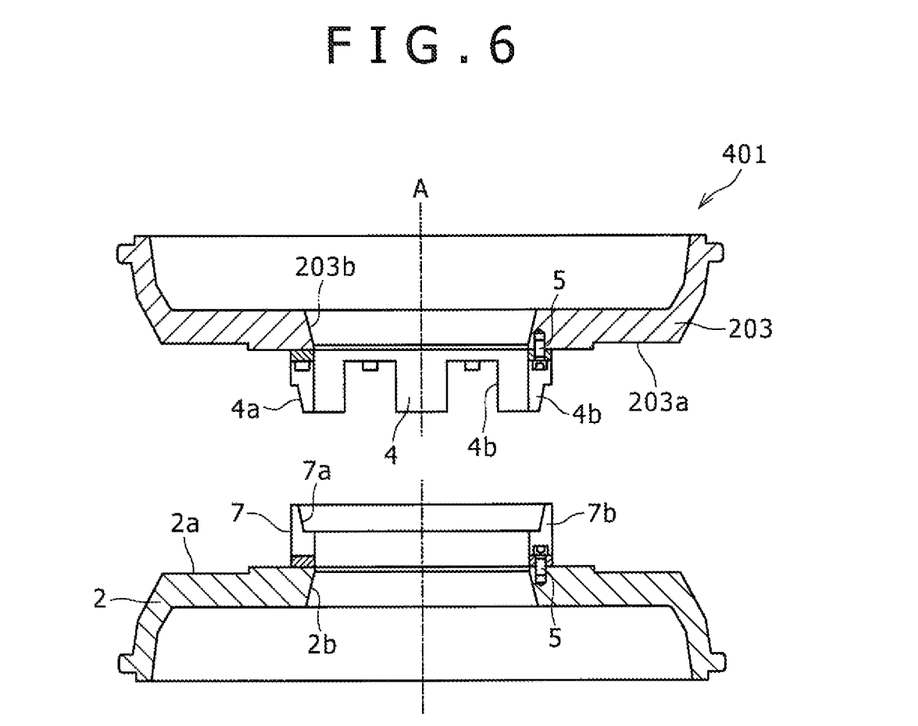
FIG. 6 is a cross-sectional view showing a tire holding member according to a fourth embodiment of the present invention.

Next, a tire holding member 401 according to a fourth embodiment of the present invention will be described. In addition, components same as the above-mentioned components are designated by the same reference numerals, and explanation thereof will be omitted. The tire holding member 401 of the fourth embodiment is different from the tire holding member 301 of the third embodiment in that, as shown in FIG. 6, to the end surface 2a of the bottom rim 2 facing the top rim 203 the concave-sided annular member 7 as the concave-sided member, which is separate to the bottom rim 2 and the top rim 203, is attached by the bolt 5, and to the end surface 203a of the top rim 203 facing the bottom rim 2 the convex-sided annular member 4 as the convex-sided member, which is separate to the bottom rim 2 and the top rim 203, is attached by the bolt 5. That is, the tire holding member 401 of the fourth embodiment has a configuration in which the top rim and the bottom rim are arranged in an upside-down position with respect to the tire holding member 301 of the third embodiment.

To the end surface 2a of the bottom rim 2 the concave-sided annular member 7 is attached, and to the end surface 203a of the top rim 203 the convex-sided annular member 4 is attached. Then, the recessed section (the tapered section) 7a of the concave-sided annular member 7 serves as the recessed engaging part, and the protruding section (the tapered section) 4a of the convex-sided annular member 4 serves as the protruded engaging part. By engaging these engaging parts, the bottom rim 2 and the top rim 203 are superimposed. Thereby, when manufacturing a rim, it is not necessary to use a material whose thickness is increased by an equivalent for the engaging parts, and portions to be cut and discarded are decreased, therefore the cost can be reduced.

(Effect)

As described above, in the tire holding member 401 according to the present embodiment, similar effects to the tire holding member 301 of the third embodiment are achieved.

The above-described embodiments mainly include the invention which has the following configurations.

A tire holding member for a tire testing machine according to one embodiment of the present invention is provided with: a bottom rim, which is attached to the upper end of a bottom spindle that is able to rotate around a central axis in the vertical direction; a top rim, which is disposed above the bottom spindle and which is attached to the bottom end of a top spindle that is able to rotate around the central axis with the bottom spindle; and a convex-sided member, which is separate to the bottom rim and the top rim. One of the bottom rim or the top rim has a hole with the central axis at the center thereof. The other of the bottom rim or the top rim has an end surface facing the one rim. The convex-sided member is attached to the end surface of the other rim, and has a protruding section positioned closer to the hole side than the end surface side. The bottom rim and the top rim are positioned by each other in a state in which the center of each coincides at the central axis due to the protruding section and the hole engaging with each other.

As described above, in a case where the engaging part with the protruding section provided on the rim is integrated with the rim body or attached over the entire area in the thickness direction of the rim, the thickness of the original material must be increased by an equivalent for the engaging part, the material cost becomes high, and portions to be cut and discarded are increased. Particularly, although stainless steel may be adopted as a material for the rim from the viewpoint of rust prevention, stainless steel is expensive and not easy to cut.

Thus, in the tire holding member, to the end surface of the other rim the convex-sided member, which is separate to the bottom rim and the top rim, is attached. Then, by engaging the protruding section of the convex-sided member with the hole, the bottom rim and the top rim are superimposed at a desired position. That is, the bottom rim and the top rim are positioned by each other in a state in which the center of each coincides at the central axis. Accordingly, in the tire holding member, when manufacturing a rim, it is not necessary to use a material whose thickness is increased by an equivalent for the engaging parts, and portions to be cut and discarded are decreased. Therefore, the cost can be reduced.

Moreover, the tire holding member preferably has such a configuration that the inside surface of the hole has a tapered shape, the convex-sided member has an annular shape with the central axis at the center thereof, and the outer peripheral surface of the protruding section of the convex-sided member has a tapered shape that is able to engage with the inside surface of the hole. In the configuration, by engaging the inside surface of the hole having a tapered shape and the outer peripheral surface of the protruding section having a tapered shape, centering between the top rim and the bottom rim can be easily performed.

Moreover, in the tire holding member, the convex-sided member may have a recessed section, which is recessed from a region facing the one rim toward the other rim side, and may be screwed to the other rim at the recessed section. In such a manner, by adopting the configuration in which the convex-sided member is screwed to the other rim at the recessed section, it is not necessary to provide a flange portion for screwing at the convex-sided member. Therefore, since the convex-sided member can be made compact, the material cost can be reduced.

Moreover, preferably in the tire holding member, the depth of the recessed sections (the recessed dimension in a direction of the central axis of the recessed section) is larger than the engaging length in the direction of the central axis where the hole and the convex-sided member are engaged, and thus a space inside the radial direction of the convex-sided member and a space outside the radial direction are communicated at a portion of the recessed section. According to the configuration, even when the hole and the convex-sided member are engaged in the direction of the central axis at a position where the bottom rim and the top rim are close to each other, the space inside the radial direction of the convex-sided member is communicated with the outside (the interior space of the tire) through the recessed section. Therefore, when the tire is held by the bottom rim and the top rim, the air introduced into the space inside the radial direction of the convex-sided member can be supplied into the tire through a portion of the recessed section. Thereby, it is not necessary to separately provide a path for supplying the air introduced into the space inside the radial direction of the convex-sided member into the tire.

Moreover, a tire holding member for a tire testing machine according to another embodiment of the present invention is provided with: a bottom rim, which is attached to the upper end of a bottom spindle that is able to rotate around a central axis in the vertical direction; a top rim, which is disposed above the bottom spindle and which is attached to the bottom end of a top spindle that is able to rotate around the central axis with the bottom spindle; a concave-sided member, which is separate to the bottom rim and the top rim; and a convex-sided member, which is separate to the bottom rim and the top rim. One of the bottom rim or the top rim has an end surface facing the other rim. The other rim has an end surface facing the one rim. The concave-sided member is attached to the end surface of the one rim, and has a recessed section positioned closer to the other rim side than the end surface side. The convex-sided member is attached to the end surface of the other rim, and has a protruding section positioned closer to the recessed section side than the end surface side. The bottom rim and the top rim are positioned by each other in a state in which the center of each coincides at the central axis due to the protruding section and the recessed section engaging with each other.

As described above, in a case where the protruded engaging part (the protruding section) and the recessed engaging part (the recessed section) provided on the rim are integrated with the rim body or attached over the entire area in the thickness direction of the rim, the thickness of the original material must be increased by an equivalent for the engaging parts, the material cost becomes high, and portions to be cut and discarded are increased. Particularly, although stainless steel may be adopted as a material for the rim from the viewpoint of rust prevention, stainless steel is expensive and not easy to cut.

Thus, in the tire holding member for a tire testing machine according to another embodiment of the present invention, to the end surface of the one rim the concave-sided member, which is separate to the bottom rim and the top rim, is attached, and to the end surface of the other rim the convex-sided member, which is separate to the bottom rim and the top rim, is attached. Then, by engaging these engaging parts, the bottom rim and the top rim can be superimposed at a desired position. That is, the bottom rim and the top rim are positioned by each other in a state in which the center of each coincides at the central axis. Thereby, when manufacturing a rim, it is not necessary to use a material whose thickness is increased by an equivalent for the engaging parts, and portions to be cut and discarded are decreased. Therefore, the cost can be reduced.

Moreover, the tire holding member preferably has such a configuration that the concave-sided member has an annular shape with the central axis at the center thereof, the inner peripheral surface of the recessed section of the concave-sided member has a tapered shape, the convex-sided member has an annular shape with the central axis at the center thereof, and the outer peripheral surface of the protruding section of the convex-sided member has a tapered shape that is able to engage with the inner peripheral surface of the recessed section. In the configuration, by engaging the inner peripheral surface of the recessed section having a tapered shape and the outer peripheral surface of the protruding section having a tapered shape, centering between the top rim and the bottom rim can be easily performed.

Moreover, in the tire holding member, the convex-sided member may have a recessed section, which is recessed from a region facing the one rim toward the other rim side, and may be screwed to the other rim at the recessed section. In such a manner, by adopting the configuration in which the convex-sided member is screwed to the rim at the recessed section, it is not necessary to provide a flange portion for screwing at the convex-sided member. Therefore, since the convex-sided member can be made compact, the material cost can be reduced.

Moreover, preferably in the tire holding member, the depth of the recessed sections at the convex-sided member (the recessed dimension in the direction of the central axis of the recessed section) is larger than the engaging length in the direction of the central axis where the recessed section of the concave-sided member and the protruding section of the convex-sided member are engaged, and thus the space inside the radial direction of the convex-sided member and the space outside the radial direction are communicated at a portion of the recessed section of the convex-sided member. According to the configuration, even when the recessed section of the concave-sided member and the protruding section of the convex-sided member are engaged in the direction of the central axis at a position where the bottom rim and the top rim are close to each other, the space inside the radial direction of the convex-sided member is communicated with the outside (the interior space of the tire) through the recessed section. Therefore, when the tire is held by the bottom rim and the top rim, the air introduced into the space inside the radial direction of the convex-sided member can be supplied into the tire through a portion of the recessed section. Thereby, it is not necessary to separately provide a path for supplying the air introduced into the space inside the radial direction of the convex-sided member into the tire.

Moreover, on the bottom rim, a tapered section, which is able to engage with a tapered section formed at the upper end of the bottom spindle and including the central axis at the center thereof, may be formed, and on the top rim, a tapered section, which is able to engage with a tapered section formed at the bottom end of the top spindle and including the central axis at the center thereof, may be formed. According to the configuration, by engaging the tapered section of the bottom rim with the tapered section formed at the upper end of the bottom spindle and engaging the tapered section of the top rim with the tapered section formed at the bottom end of the top spindle, highly precise centering between the rim and the spindle can be easily performed.

Modification of Present Embodiment

Although the embodiments of the present invention have been described hereinbefore, these embodiments are merely exemplified as specific examples, and do not limit the present invention in particular, and specific configurations or the like can be appropriately changed in design. Moreover, the operations and effects described in the embodiments of the present invention are merely enumerated as the most preferred operations and effects derived from the present invention, and the operations and effects according to the present invention are not limited to those described in the embodiments of the present invention.

For example, in the above embodiment, although the configuration in which the tapered section provided at the bottom spindle 27 and the tapered section provided at the bottom rim are engaged and the tapered section provided at the top spindle 47 and the tapered section provided at the top rim are engaged has been exemplified, the configuration is not limited thereto. For example, a protruding section or a recessed section formed at the spindle and provided with no tapered section may be engaged with a recessed section or a protruding section formed at the rim and provided with no tapered section. Similarly, although the configuration in which the tapered section provided at the convex-sided annular member 4 and the tapered section provided at the hole are engaged and the tapered section provided at the convex-sided annular member 4 and the tapered section provided at the concave-sided annular member 7 are engaged has been exemplified, the configuration is not limited thereto. For example, a protruding section formed at the convex-sided annular member 4 and provided with no tapered section may be engaged with a recessed section formed at the hole or the concave-sided annular member 7 and provided with no tapered section.

In the above embodiment, although the convex-sided member and the concave-sided member have been described as having an annular shape, the shape of these members are not necessarily limited to the annular shape.

REFERENCE NUMERALS 1, 201, 301, 401 Tire holding member
2 Bottom rim
2a End surface
2b Tapered section
3 Top rim
3a End surface
3b Hole
3c Tapered section
4 Convex-sided annular member
4a Tapered section
4b Recessed section
5 Bolt
6 Space
7 Concave-sided annular member
7a Tapered section
7b Recessed section
10 Tire
27 Bottom spindle
28 Plunger
28x Air supply hole
47 Top spindle
100 Tire testing machine
202 Bottom rim
202a End surface
202b Hole
202c Tapered section
203 Top rim
203a End surface
203b Tapered section
A Central axis

The invention claimed is:

1. A tire holding assembly for use in a tire testing machine including a bottom spindle rotatable around a vertical central axis and a top spindle rotatable around the vertical central axis, the tire holding assembly comprising:
   a bottom rim to be attached to an upper end of the bottom spindle, the bottom rim having a main surface arranged perpendicular to the vertical central axis, and a first outer periphery;
   a top rim to be attached to a bottom end of the top spindle, the top rim having a main surface arranged perpendicular to the vertical central axis and facing the main surface of the bottom rim, and a second outer periphery;
   a convex member detachably attached to one of the bottom rim and the top rim, the convex member being rigidly directly fixed on the main surface of the one rim, the convex member having:
      a vertical axis coinciding with the vertical central axis,
      a smaller horizontal extent than each of the respective main surfaces of the bottom rim and the top rim,
      a protruding section, and
      an air passing hole,
   a reception hole formed in the other of the bottom rim and the top rim, the reception hole having a vertical axis coinciding with the vertical central axis, and operable to engage with the protruding section when the first outer periphery and the second outer periphery are made closer to each other to sandwich a tire to be tested between the first outer periphery and the second outer periphery;
   wherein the convex member has a recessed section, and is fixed on the main surface of the one rim with a screw disposed in the recessed section, and
   the convex member has an annular shape having a vertical axis coinciding with the vertical central axis,
   the recessed section has a vertical dimension larger than a vertical dimension of the reception hole to define the air passing hole for allowing air to flow from an inside of the annular convex member to an outside of the annular convex member when the reception hole and the protruding section engage with each other,
   the protruding section of the convex-sided member are engaged, and thus a space inside the radial direction of the convex-sided member and a space outside the radial direction are communicated at a portion of the recessed section of the convex-sided member.

2. The tire holding assembly according to claim 1, wherein the upper end of the bottom spindle includes a tapered section, the bottom end of the top spindle includes a tapered section, the bottom rim includes a hole having a tapered section which is able to engage with the tapered section formed at the upper end of the bottom spindle, and the top rim includes a hole having a tapered section which is able to engage with the tapered section formed at the bottom end of the top spindle.

3. A tire holding assembly for use in a tire testing machine including a bottom spindle rotatable around a vertical central axis and a top spindle rotatable around the vertical central axis, the tire holding assembly comprising:

a bottom rim to be attached to an upper end of the bottom spindle, the bottom rim having a main surface arranged perpendicular to the vertical central axis, and a first outer periphery;

a top rim to be attached to a bottom end of the top spindle, the top rim having a main surface arranged perpendicular to the vertical central axis and facing the main surface of the bottom rim, and a second outer periphery;

a convex member detachably attached to one of the bottom rim and the top rim, the convex member being rigidly directly fixed on the main surface of the one rim, the convex member having:

a vertical axis coinciding with the vertical central axis, a smaller horizontal extent than each of the respective main surfaces of the bottom rim and the top rim, a protruding section, and an air passing hole, a reception hole formed in the other of the bottom rim and the top rim, the reception hole having a vertical axis coinciding with the vertical central axis, and operable to engage with the protruding section when the first outer periphery and the second outer periphery are made closer to each other to sandwich a tire to be tested between the first outer periphery and the second outer periphery;

wherein the reception hole has a tapered inside surface, the convex member has an annular shape having a vertical axis coinciding with the vertical central axis; and the protruding section of the convex member has a tapered outer surface that comes into contact with the inside surface of the hole, wherein the convex member has a recessed section, and is fixed on the main surface of the one rim with a screw disposed in the recessed section, and the recessed section has a vertical dimension larger than a vertical dimension of the reception hole to define the air passing hole for allowing air to flow from an inside of the annular convex member to an outside of the annular convex member when the reception hole and the protruding section engage with each other.

* * * * *